(12) United States Patent
Huntress

(10) Patent No.: US 6,400,647 B1
(45) Date of Patent: Jun. 4, 2002

(54) REMOTE DETECTION SYSTEM

(75) Inventor: Gary B. Huntress, Swansea, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/728,876

(22) Filed: Dec. 4, 2000

(51) Int. Cl.[7] .............................. H04B 1/38; G01S 3/80
(52) U.S. Cl. ...................................... 367/136; 367/906
(58) Field of Search ............................ 367/3, 5, 135, 367/136, 906; 340/541, 566

(56) References Cited

U.S. PATENT DOCUMENTS

| | | | | |
|---|---|---|---|---|
| 3,552,520 A | * | 1/1971 | Naubereit | 367/136 |
| 4,322,828 A | * | 3/1982 | Hoff et al. | 367/136 |
| 4,408,533 A | * | 10/1983 | Owen et al. | 102/211 |
| 4,811,308 A | * | 3/1989 | Michel | 367/136 |
| 4,885,724 A | * | 12/1989 | Read et al. | 367/77 |
| 5,060,206 A | * | 10/1991 | DeMetz et al. | 367/136 |
| 5,703,835 A | * | 12/1997 | Sharkey et al. | 367/124 |
| 5,721,712 A | * | 2/1998 | LaPointe | 367/136 |
| H1916 H | * | 11/2000 | Hollander | 367/118 |

* cited by examiner

*Primary Examiner*—Ian J. Lobo
(74) *Attorney, Agent, or Firm*—Michael J. McGowan; James M. Kasischke; Prithvi C. Lall

(57) ABSTRACT

A remote acoustic detection system includes at least one detection unit delivered to a remote or inaccessible location by a missile or other aircraft. The detection unit monitors acoustic events at the location such as aircraft takeoffs and landings and preferably is provided the capability of classifying the events, for example, as to the event or type of aircraft. A sleep mode can be provided to conserve power such that the unit is activated only in the presence of threshold acoustic levels. The unit also includes a wireless transceiver for relaying data to a central monitoring authority, which may be a passing or loitering aircraft. Each detection unit may be provided with an address for allowing monitoring of a network of detection units.

14 Claims, 2 Drawing Sheets

REMOTE DETECTION SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The present invention relates to remote detection of acoustic events. More specifically, the invention relates to an automated system for detecting aircraft including a detection unit deployed from an aircraft or missile to a remote surface location. The detection unit can store and/or relay processed data to a monitoring authority.

(2) Description of the Prior Art

The desire to detect the presence of aircraft is well known. It has also been proposed to identify and locate detected aircraft based on acoustic or seismic data. For example, U.S. Pat. No. 5,721,712 to LaPointe discloses an aircraft detection system for a submarine having a rotatable acoustic antenna array, including several radially separated microphones, mounted on a submarine mast. The microphones relay acoustic signals to a signal processor for detection and location of an aircraft based on triangulation. The signal processor is said to match the acoustic signature to classify the aircraft.

U.S. Pat. No. 4,322,828 to Hoff et al. discloses a jet aircraft maneuver classifier. A geophone capable of detecting seismic signals is provided proximate an airfield used by jet aircraft. To classify aircraft activity in terms of taxi, take-off and fly-over, seismic signals are amplified and filtered to pass only two signal envelopes, i.e., of a low and a high frequency range. Maneuvers are classified by comparing the times each of two signal envelopes reach a predetermined amplitude threshold.

U.S. Pat. No. 4,408,533 to Owen et al. discloses an acoustic or seismic target ranging system to provide a munition firing signal when a target reaches its closest approach. The system utilizes a single signal detector located on a munition for measurement of signal magnitude and frequency. The closest approach of a target is determined by comparing absolute signal magnitude to the rate of change of signal magnitude.

U.S. Pat. No. 5,060,206 to DeMetz, Sr. discloses an acoustic aerobuoy detector for detecting propeller-driven aircraft. A floating buoy is provided with an exposed air resonator chamber dimensioned to amplify frequencies characteristic of distant airborne propeller aircraft. The buoy is provided with an underwater cable for transmission of an amplified signal to an underwater craft or surface craft for processing by an on-board signal processor.

The prior art, however, does not meet current needs. For example, the prior art provides no means to deploy a detection unit into a remote hostile or inaccessible environment such that monitoring can be conducted elsewhere. Further, the prior art does not provide a detection network and central monitoring authority. The present invention addresses these and other shortcomings of the prior art.

SUMMARY OF THE INVENTION

It is a general purpose and object of the present invention to provide an improved aircraft detection system. It is another object of the present invention to provide an automated aircraft detection system for detecting aircraft landing and takeoff.

It is another object of the present invention to provide a remote aircraft detection unit capable of being deployed from a missile. It is another object of the present invention to provide a remote detection unit capable of identifying a detected aircraft based on, e.g., acoustic signature.

It is another object of the present invention to provide a remote detection unit capable of processing, identifying, storing and transmitting measurement data.

It is another object of the present invention to provide a remote detection unit capable of wireless data transmission to a central monitoring authority.

It is another object of the present invention to provide a remote detection unit having improved power efficiency and advanced computing power.

It is another object of the present invention to provide a method of deploying by missile and operating an automated wireless remote detection unit.

These and other objects are accomplished with the present invention by providing a system for delivering at least one detection unit from a missile, such as a Tomahawk cruise missile in the payload dispensing configuration, to a remote surface location.

The detection unit of the present invention comprises a transducer for acquiring signals from the surrounding environment. Data samples are processed by a digital signal processor and transferred to a memory location and/or forwarded to a central authority. In a preferred embodiment, data are converted in the processor from the time domain to the frequency domain. Spectral analysis of frequency data can be accomplished by peak detection algorithms. A wireless communication system is provided for transmitting processed data to a central authority. The detection unit of the present invention is preferably also provided with a waveform library representing known aircraft acoustic signatures. Peak detection data can be cross-correlated to library data for aircraft identification. The detection unit preferably also includes a power-conserving "sleep" mode provided by a gross audio detection circuit which remains on at all times and switches remaining unit power on and off based on a threshold ambient signal level.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENT

Figure 1:
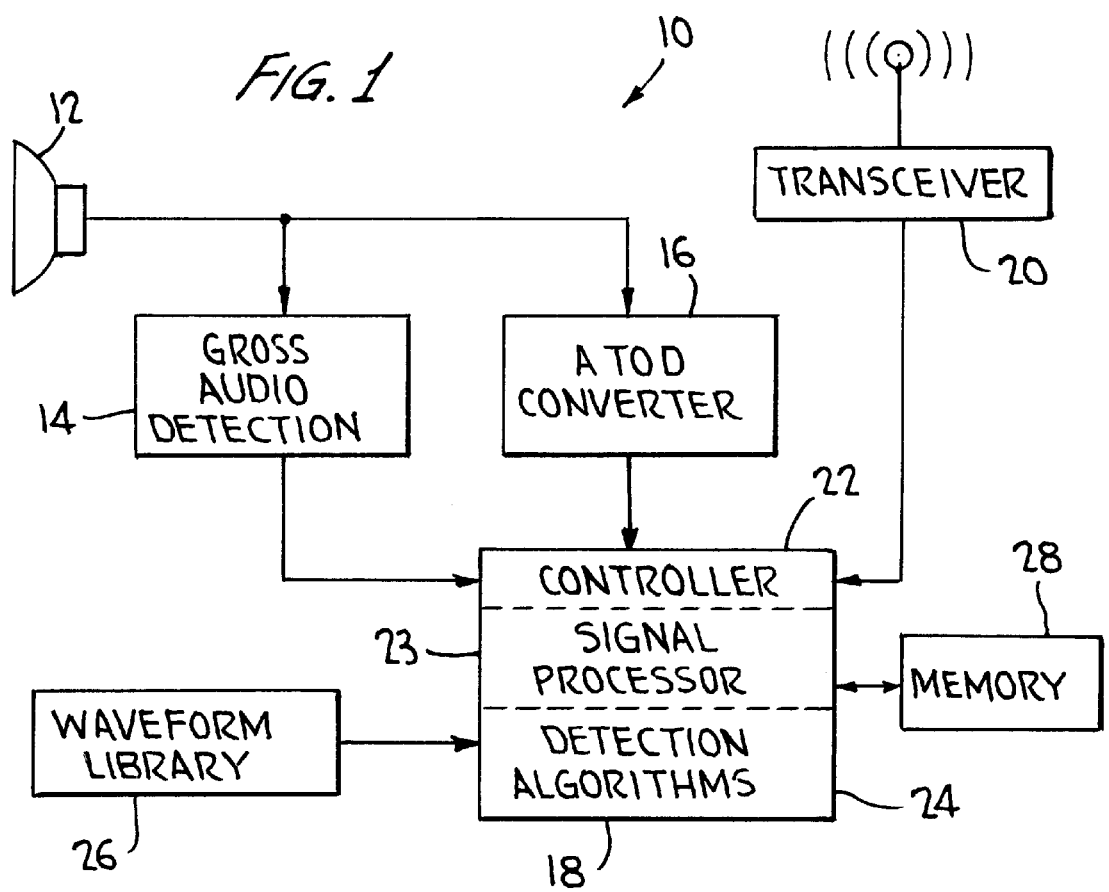
FIG. 1 is a schematic diagram of a remote detection unit according to the present invention.

Referring to FIG. 1, in accordance with the present invention, remote acoustic detection unit 10 is represented in schematic form. Unit 10 includes acoustic transducer 12, gross audio detection circuit 14, analog to digital (A/D) converter 16, processor 18 and transceiver 20. Processor 18 has functional units including a controller 22, a signal processor 23 and detection algorithms 24. Processor 18 is joined to receive information from a waveform library 26 and to transmit and receive data from memory 28.

At least one acoustic detection unit such as unit 10 can be remotely delivered by a missile such as a Tomahawk missile configured as a TLAM-D payload dispensing variant. The Tomahawk provides precise delivery of up to approximately 150 or more individual detection units to a desired surface location. As explained in greater detail hereafter, a plurality of detection units can operate as a network. Thus, for example, a payload of detection units can be delivered to a hostile airfield which may be inaccessible by any other means. Once delivered, the units can autonomously detect aircraft takeoffs and landings and classify active aircraft.

Returning to FIG. 1, unit 10 operates autonomously once deployed. Thus, the presence of aircraft is characterized by a very high average local acoustic power. At other times, the same area will be relatively quiet. Gross audio detection circuit 14 is a dedicated circuit which monitors the average acoustic power in the local area through transducer 12. Circuit 14 provides a power-conserving sleep mode by applying power to the remaining components of unit 10 only when a predetermined threshold acoustic power is reached. This is achieved by sending a wake-up signal to processor 18 controller 22. It is preferred that unit 10 be provided with a sleep mode in order to increase its operational life in a remote or inaccessible location. Unit 10 can be powered by any suitable source such as a battery. Once circuit 14 has activated processor 18 and the rest of unit 10, blocks of signals (typically 20 kilobytes each) representing acoustic events are sequentially collected from transducer 12 via A/D converter 16. A preferred A/D converter is a low power, low speed, twelve bit converter with a sampling rate of 40 kHz (70 dB signal to noise ratio). Digital measurement data from converter 16 are transferred to signal processor 23, which transfers each block to memory 28 after processing, described below.

Signal processor 23 is preferably a dedicated digital signal processor (DSP) such as a TMS320C54X family, sixteen bit, fixed point, low power, DSP from Texas Instruments. (A more powerful DSP can be used if finer spectral resolution in peak detection is desired.) Signal processor 23 performs spectral analysis of measurement data blocks received from converter 16. Detection algorithms 24 are employed by processor 18 in any desired manner to extract and identify spectral features from the signals of each data block. In signal processor 23, Fast Fourier Transform (FFT) converts measurement data from the time domain to the frequency domain. Spectral peaks in the frequency domain can be extracted by a thresholding algorithm or filter and thereafter identified. The resulting spectral features for a given data block can be stored in memory 28, along with the time of the event. Data can also be provided in real time to transceiver 20. In order to reduce the overall chip count and power consumption, signal processor 23 preferably has sufficient on-chip memory to store and execute the detection algorithms itself.

Signal processor 23 will preferably have further reference to a waveform library 26 for cross-correlation to the spectral features generated from acoustic measurements. For example, the library 26 can contain a series of waveforms corresponding to the acoustic signatures of known jet aircraft. Signal processor 23 implements a cross-correlation algorithm to provide a measurement of the similarity between extracted spectral features from a given data block and library 26. Similarity information, which can identify an aircraft takeoff or landing in terms of the particular type of aircraft involved, can be stored in memory and/or transmitted. Accuracy of classification can be enhanced by comparison of classification results from a series of sequential data blocks. The number of acoustic events recorded by unit 10 is only limited by the capacity of the memory 28 provided.

To transmit data (e.g., to a central monitoring authority), unit 10 includes a low power wireless transceiver 20, such as one operating in accordance with the IEEE 802.11 standard. Transceiver 20 provides point-to-point networking capability within a local area (preferably at least one square kilometer) and can communicate with any suitable monitoring means. A preferred embodiment includes employing a reconnaissance aircraft flying through the vicinity of unit 10 and establishing an ad hoc network between them by requesting and receiving processed data stored in unit 10. Unit 10 can also be monitored in real time (e.g., by a unmanned aerial vehicle loitering in the area of unit 10). As mentioned above, a missile can deliver a large number of detection units from its payload, thereby deploying a network of numerous detection units. In this case, each unit can be provided with a unique address to accompany and identify data transmitted from each separate detection unit.

Figure 2:
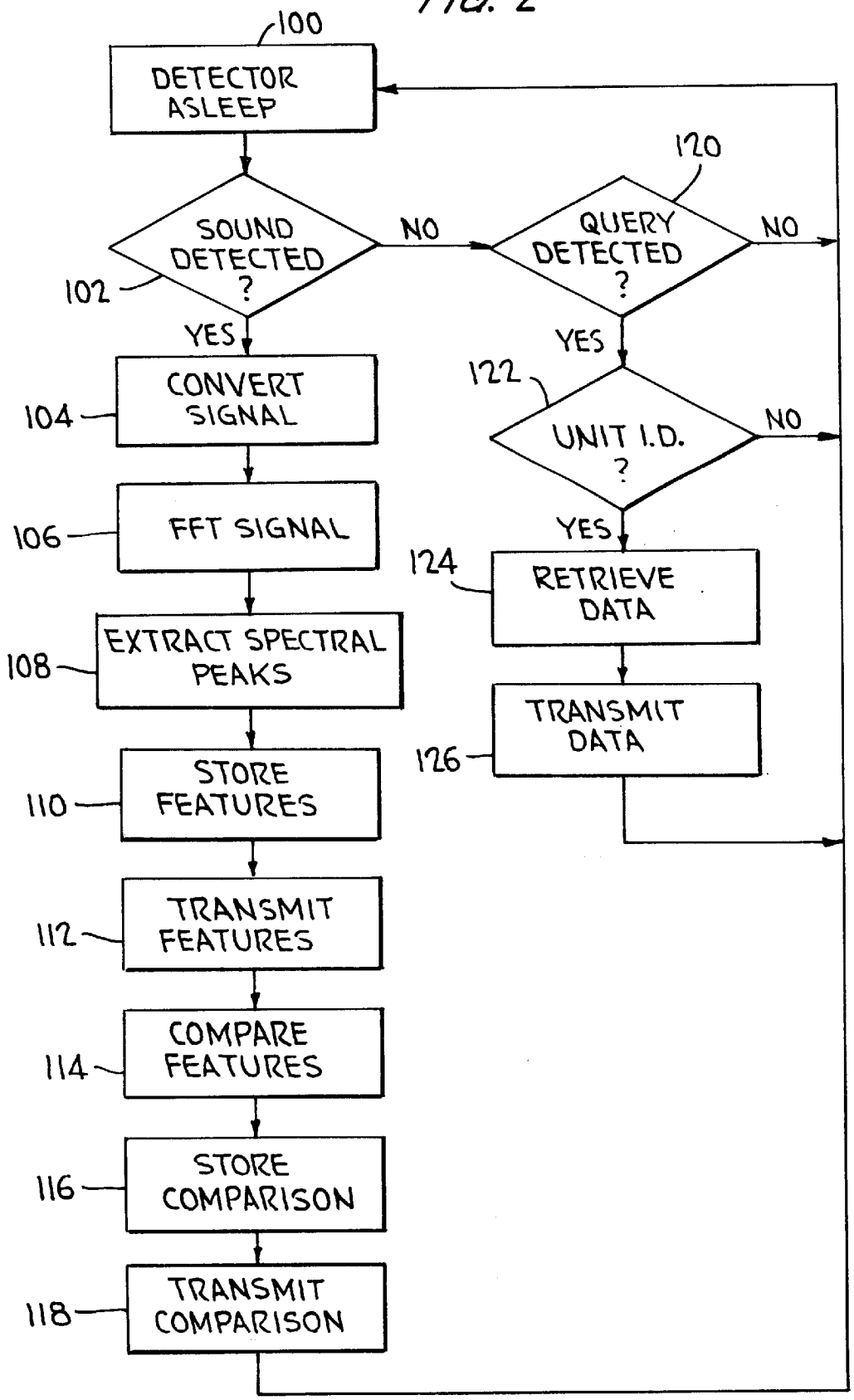
FIG. 2 is a flowchart showing the operating algorithm according to the present invention.

FIG. 2 provides a flowchart showing the operating algorithm of the current invention. After delivery, the acoustic detector 10 is in power save mode or asleep, step 100. It stays in this mode until either a sound is detected by transducer 12 or a query signal is received by transceiver 20.

When the gross audio detector 14 detects a sound in step 102, the controller 22 activates the other detector 10 circuits. In step 104, A to D converter 16 converts the analog sound signal into a digital sound signal and provides the digital signal to processor 18. Signal processor 23 performs a Fast Fourier Transform on the digital signal in step 106 and then extracts the spectral peaks of the signal in step 108. The receive time and spectral analysis of the signal represent features of the signal which are saved by processor 18 in memory 28 in step 110. Optionally, these features can be provided to transceiver 20 and transmitted in real time in step 112. This transmission can include an identification code or other means for identifying the transmitter. In step 114, signal processor 23 compares the features with features contained in the waveform library 26. Results of this comparison are stored in memory 28 in step 116 and, optionally, may be transmitted by transceiver 20 in step 118. After the transducer 12 stops receiving sounds, detector 10 returns to sleep mode 100.

When transceiver 20 detects a radio query to the detector, step 120, the controller 22 activates detector 10 circuits. In step 122, a controller 22 then determines if the received query is for the particular detector be determining if the query includes the detector's identification code. If the query is for another detector, unit 10 returns to sleep mode. This process can be performed otherwise by having the transceiver 20 only signal the controller 22 if certain query frequencies are transmitted. These frequencies can vary for each detector 10. Upon indication that detector 10 is being queried, controller 22 retrieves data from memory 28 in step 124. Data is then provided to transceiver for transmission in step 126. After transmitting the data, detector 10 returns to sleep mode 100. Unit 10 can be modified as desired to provide enhanced or additional capabilities. Any physical phenomenon can be measured by adding or substituting transducer 12 for, e.g., a Geiger counter, seismic sensor, inclinometer, etc. Further, the functions of the system can be allocated between unit 10 and a monitoring authority as desired. Thus, for example, the classification function based on waveform library 26 can be performed at the monitoring authority. Similarly, other functions can be assigned as desired.

The system of the present invention exploits the capabilities of missile payload delivery and takes advantage of low power devices, power management and advancements in DSP computing power and spectral analysis algorithms to provide an efficient and reliable system for remote aircraft detection and classification, previously unavailable.

In light of the above, it is therefore understood that within the scope of the following claims, the invention may be practiced otherwise than as specifically described.

What is claimed is:

1. A remote detection method comprising:

delivering a detection unit to a remote surface location;

receiving signals at said delivered unit through a transducer;

digitizing said received signals in an analog to digital converter to provide digitized received signals; and extracting spectral features from said digitized received signals to provide processed signal data;

storing said processed signal data prior to forwarding said processed signal data; and forwarding processed signal data by a wireless transceiver to a central monitoring authority.

2. The method of claim 1, further comprising the step of forwarding time of occurrence information in conjunction with said processed signal data.

3. The method of claim 1, further comprising the step of converting said digitized received signals to digitized frequency domain signals prior to said extracting spectral features.

4. The method of claim 1, further comprising the step of forwarding address information identifying said unit in conjunction with the step of forwarding said processed signal data.

5. The method of claim 1, further comprising the step of placing said unit in a sleep mode until said received signals exceed a predetermined threshold level.

6. The method of claim 1, further comprising the steps of:

generating classification information by comparison of said extracted spectral features to a library of waveforms; and forwarding classification information for said processed signal data.

7. The method of claim 6 further comprising the step of comparing said classification information to subsequent classification information derived from subsequently received signals.

8. The method of claim 1, wherein said step of delivering is accomplished utilizing a missile to deliver at least two said detection units.

9. The method of claim 8 further comprising the steps of:

providing each delivered detection unit with a unique address; and forwarding said unique address in conjunction with said step of forwarding processed signal data.

10. The method of claim 9 further comprising the step of monitoring said at least two detection units.

11. A remote detection apparatus comprising:

a transducer for receiving acoustic signals;

an analog-to-digital converter joined to said transducer for converting said acoustic signals;

a processor joined to said analog-to-digital converter, said processor processing said converted signals into features;

a waveform library having known features therein joined to said processor, said processor comparing said features with said known features, said transceiver receiving compared features from the processor and transmitting said compared features; and a transceiver joined to said processor for transmitting said features.

12. A remote detection apparatus comprising:

a transducer for receiving acoustic signals;

an analog-to-digital converter joined to said transducer for converting said acoustic signals;

a processor joined to said analog-to-digital converter, said processor processing said converted signals into features;

memory joined to said processor for retaining said features;

a gross audio detection unit joined to said transducer and said processor for providing an activation signal to said processor upon receipt of an acoustic signal above a predetermined threshold at said transducer; and a transceiver joined to said processor for transmitting said features, said transceiver being capable of receiving an external command signal, providing said command signal to said processor, and transmitting said retained features in response to the external command signal.

13. The apparatus of claim 12 wherein said processor comprises:

a controller capable of placing said apparatus in sleep mode after a predetermined period of time and placing said apparatus in active mode upon receiving one of the activation signal and the external command signal; and a signal processor for converting said converted signals into features.

14. The apparatus of claim 13 further comprising:

a waveform library having waveform characteristics therein joined to said processor;

wherein said processor further comprises detection algorithms for comparing said waveform characteristics and said features; and wherein said transceiver further transmits said compared features.

* * * * *